United States Patent [19]

Churchwell et al.

[11] 3,950,111

[45] Apr. 13, 1976

[54] STUD REMOVER

[76] Inventors: Harry B. Churchwell, 1701 Meadow Lane; Warner Quearry, 1108 Normandy Lane, both of Blytheville, Ark. 72315; Thomas K. Verzi, 126 Shore Drive, Williamsburg, Va. 23185

[22] Filed: May 24, 1974

[21] Appl. No.: 472,455

[52] U.S. Cl. .............................. 408/204; 408/703
[51] Int. Cl.² .................................... B23B 51/04
[58] Field of Search ....... 408/1, 204, 703, 205, 206, 408/207

[56] References Cited
UNITED STATES PATENTS 3,609,056   9/1971   Hougen ............................. 408/204

FOREIGN PATENTS OR APPLICATIONS 89,089    4/1957   Norway ............................. 408/1
210,876   2/1967   Sweden ............................. 408/204
710,794   8/1941   Germany ........................... 408/204
1,071,254 8/1954   France ............................. 408/204

Primary Examiner—Willie G. Abercrombie
Assistant Examiner—W. R. Briggs
Attorney, Agent, or Firm—Littlepage, Quaintance, Murphy & Dobyns

[57] ABSTRACT

A cutting tool consisting of a cylindrical stem and shank separated by a greater diameter body, the body and stem defining a shoulder, an annular cutting surface including a ring of teeth separated from each other by a flute, a larger diametered bore extending coaxially from the cutting surface into the body and a smaller diametered bore continuing through the body and shank.

7 Claims, 3 Drawing Figures

Fig.1
Fig.2
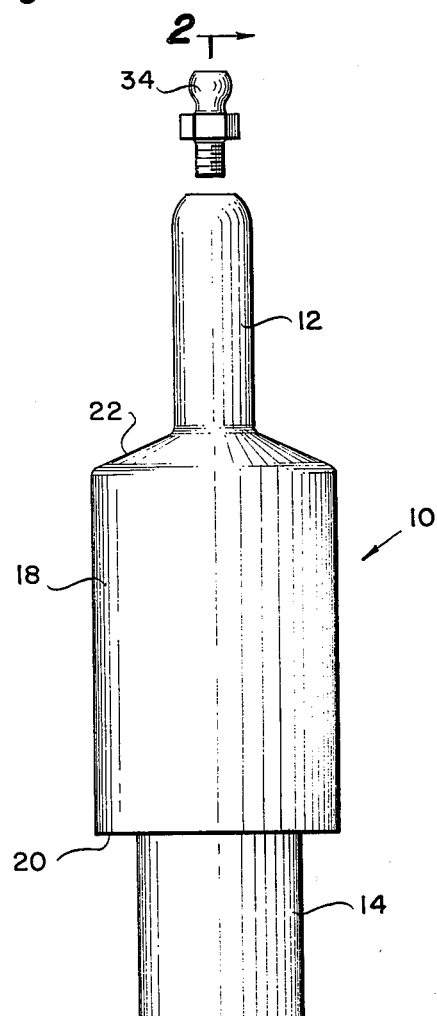
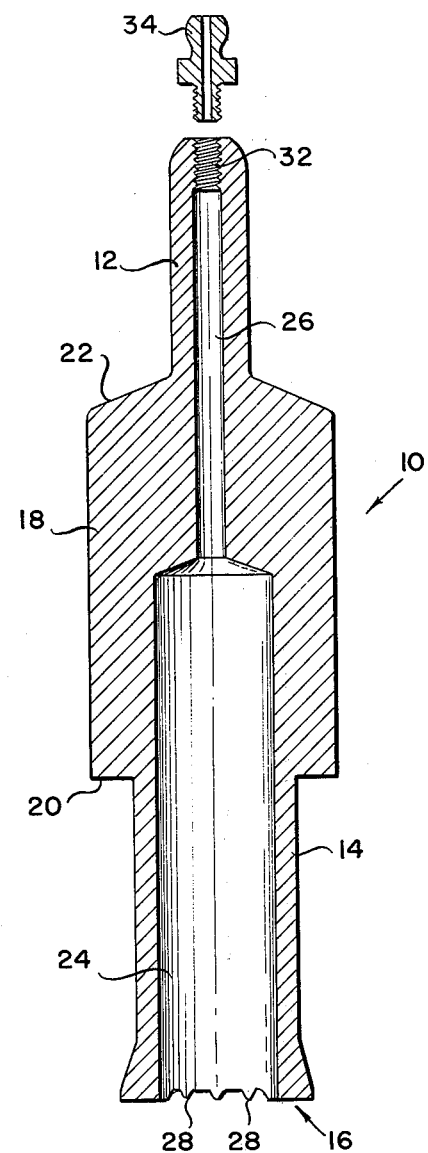
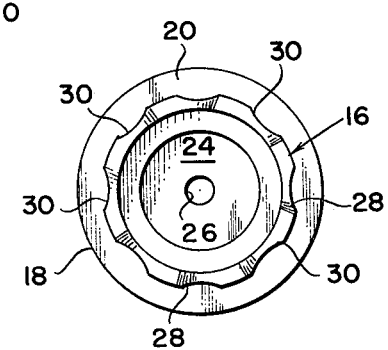
Fig.3

STUD REMOVER

BACKGROUND OF THE INVENTION

1. Field of the Invention

This invention relates to rotating axially moving cutting tools having an axial core receiving central portion and particularly relates to such a tool adapted to remove a broken or otherwise useless steel stud from an aluminum aircraft engine cylinder jug without the necessity of first removing the cylinder jug from the aircraft engine.

2. Description of the Prior Art

Exhaust manifolds on reciprocating aircraft engines are generally of welded steel tube to withstand the high temperatures of exhaust gases created in the normal operation of the engine. The cylinders of the engine are usually forged steel cylinder barrels or liners force fit inside cast aluminum alloy cylinder heads commonly referred to as "jugs", the jugs having a plurality of air cooling fins extending outwardly as well as the intake and exhaust ports, valve seats, spark plugs, etc. Threaded steel studs securely seated in the aluminum jugs adjacent the exhaust ports project through holes in a flange joined to the end of the manifold. Appropriate nuts and washers secure the flange and, thus, the steel manifold to the aluminum jug.

During operation of the aircraft, the periodic heating and cooling of the engine and manifold coupled with the difference in the rate of thermal expansion of the two materials involved often leads to metal fatigue and ultimate failure of one or more of the studs. A problem thus results requiring the replacement of the broken steel stud with another of the same size as required by F.A.A. regulations.

Previously, it was necessary to remove the jug from the remainder of the aircraft engine, position the jug very carefully in a vertical milling machine or other similar precision drilling device, center punch and then drill out the stud with a conventional twist drill. The operation had to be executed with care as the aluminum jug is considerably softer than the hardened steel stud and the drill, following the path of least resistance, would wander off the steel into the aluminum. This would resul in a hole which was misaligned and too big to accept a new stud of the prescribed dimension. It is virtually impossible to perform this operation with a hand-held drill.

The whole operation of first removing the jug from the engine, boring out the broken stud, inserting a hollow, double-threaded adapter, seating a new stud and replacing the jug on the engine is so time-consuming, and thus, so costly, that when a stud fails, often the whole jug is simply replaced with a new one. This is expensive and undoubtedly a waste of resources.

No previous method or apparatus exists for successfully removing the broken stud from the aluminum jug while the jug is still on the engine, especialy if the engine is still in place in the aircraft. The use of a conventional extractor is unsatisfactory as the steel stud is usually bonded to the aluminum jug so well as to defy any attempt to back the broken stud out of the hole.

The hollow double-threaded adapters usually used in this operation are of the type marketed by Heli-Coil Corporation of Danbury, Connecticut.

SUMMARY OF THE INVENTION

A broken steel stud can be successfully removed from an aluminum jug or other similar workpiece without removing the jug or workpiece from the engine by selecting a stud-removing tool as herein described having an inside diameter of substantially the same dimension as the outside diameter of the stud to be removed. The stud remover can be used in connection with a conventional hand-held low speed drill to remove a thin layer of the workpiece surrounding the broken stud, the stud remover being guided from the inside by the broken stud itself. The stud remover is permitted to penetrate only to the proper depth by a shoulder on the remover as later described. The resulting hole can then be appropriately tapped and a hollow, double-threaded adapter inserted in a conventional manner and a new stud, the same size as the original stud, seated in the adapter. This eliminates the necessity of removing the cylinder jug from the engine and reseating it after the new stud is in place.

The stud remover consists generally of a cylindrical body, including a shank portion adapted to be received by a drill chuck, a stem portion for supporting a cutting surface and a greater diametered and thicker bodied portion between the shank portion and the stem portion. At the junction of the stem portion and thicker bodied portion is a step-wise discontinuity defining a shoulder for restricting the depth of penetration of the tool. A cutting surface is fixed at the opposite end of the stem portion from the step-wise discontinuity. The cutting surface includes an annular ring of teeth, the annular ring having a greater outside diameter than the stem portion, but a lesser outside diameter than the thicker bodied portion. Between each pair of adjacent teeth in the annular ring of teeth is a flute for allowing the escape of waste cut by the teeth from the kerf. A first longitudinal bore having a diameter substantially the same as the outside diameter of the stud to be removed extends from the cutting surface into the thicker bodied portion of the cylindrical body and is coaxial therewith. A second coaxial longitudinal bore of smaller diameter than the first bore extends from the first bore through the remaining thicker bodied portion and through the shank portion of the cylindrical body for permitting the removal of the stud from the tool after the stud has been removed from the aluminum jug, or other workpiece. The smaller diametered bore can also be used for inserting an appropriate cutting assisting fluid or compressed air for cooling the cutting surface and workpiece to prevent any change in their metallurgical properties. The second longitudinal bore can be threaded so as to receive a coupling means to facilitate the injection of cutting fluids including compressed air.

The invention wil be more readily understood by consideration of the detailed description of the accompanying drawings and the claims.

BRIEF DESCRIPTION OF THE DRAWINGS

FIG. 1 is an elevational view of a stud remover according to the invention.

FIG. 2 is a sectional view of the stud remover taken along the line 2—2 of FIG. 1.

FIG. 3 is an elevation detail of the cutting surface of the stud remover of FIG. 1.

DETAILED DESCRIPTION OF THE DRAWINGS

A stud remover according to this invention shown in FIG. 1 consists generally of a tubular member 10 including a shank portion adapted to be received by the chuck of a drill, a stem portion 14 supporting a cutting surface 16 and a thicker bodied portion 18 of greater outside diameter than either the shank portion 12 or the stem portion 14. A step-wise discontinuity at the junction of the stem portion 14 and the greater diametered portion 18 forms a shoulder 20 for restricting the depth of penetration of the tool in a workpiece. The greater diametered portion 18 extending from the shoulder 20 to a tapered shank shoulder 22 ensures sufficient strength to minimize longitudinal distortion and wandering of the cutting surface 16.

As shown in FIG. 2, a stud receiving longitudinal bore 24, which is coaxial with the cylindrical body of the stud remover, extends from the cutting surface 16 through the stem portion 14 and into the thicker bodied portion 18. The bore 24 has a diameter substantially the same as the outside diameter of a stud which is sought to be removed from a jug or other workpiece. A second coaxial longitudinal bore 26 of smaller diameter extends from bore 24 through the remainder of the thicker bodied portion 18 and through the shank portion 12. The cleaning bore 26 facilitates removal of a stud from the tool after the stud has been bored free from the cylinder jug and received by the larger diametered receiving bore 24.

The longitudinal bore 26 can have a threaded portion 32 adapted to receive a coupling means 34 for facilitating the injection of cutting fluids including compressed air for cooling the cutting surface and workpiece.

As shown in FIG. 3, the cutting surface 16 consists of an annular ring of teeth 28 and between each pair of adjacent teeth a flute 30 for allowing for the escape of waste cut by the teeth from the kerf. The inside diameter of the annular ring of teeth is the same as the core receiving bore 24, while the outside diameter of the annular ring of teeth is smaller than the outside diameter of the larger diametered body portion 18. The center of each flute has an outside diameter no greater than the outside diameter of the stem portion 14.

We claim:

1. A cutting tool for removing a stud from a workpiece by cutting a kerf around the stud comprising a cylindrical body including a shank portion, a stem portion, and a greater diametered portion between the shank portion and the stem portion, a cutting surface fixed at one end of the stem portion, and a longitudinal bore coaxial with said cylindrical body and having a diameter substantially the same as the outside diameter of said stud extending from said cutting surface into said greater diametered portion said cutting surface comprising an annular ring of teeth, the annular ring having a greater outside diameter than said stem portion but less than said greater diametered portion, and between each pair of adjacent teeth a flute for allowing the escape of waste cut by the teeth from the kerf, the waste being removed only along the outside of said stem.

2. A cutting tool according to claim 1 further comprising a step-wise discontinuity at the junction of said stem portion and said greater diametered portion defining a shoulder for restricting the depth of penetration of the tool in the workpiece.

3. A cutting tool according to claim 1 wherein a second coaxial bore of smaller diameter than said longitudinal bore extends from said longitudinal bore through the remaining greater diametered portion and through said shank portion for permitting the withdrawal of the stud from the tool after the stud has been removed from the workpiece.

4. A cutting tool according to claim 3 wherein a portion of said second coaxial bore is threaded for receiving a coupling means for facilitating the injection of fluids.

5. A cutting tool according to claim 4 further comprising a coupling means attached to said second coaxial bore for facilitating the injection of fluids.

6. A cutting tool for removing a stud from a workpiece of softer material than the stud by cutting a kerf around the stud comprising a cylindrical body including a shank portion adapted to be received by a drill chuck, a stem portion for supporting a cutting surface, and a greater diametered and thicker bodied portion between the shank portion and the stem portion, a stepwise discontinuity at the junction of the stem portion and the thicker bodied portion defining a shoulder for restricting the depth of penetration of the tool in the workpiece, a cutting surface fixed at the opposite end of the stem portion for said stepwise discontinuity including an annular ring of teeth, the annular ring having a greater outside diameter than said stem portion but less than said thicker bodied portion, and between each pair of adjacent teeth a flute for allowing the escape of waste cut by the teeth from the kerf, the waste being removed only along the outside of said stem, a first longitudinal bore, coaxial with said cylindrical body and having a diameter substantially the same as the outside diameter of said stud, extending from said cutting surface into said thicker bodied portion for receiving the stud and guiding the cutting tool on the stud, and a second coaxial longitudinal bore of smaller diameter than said first bore extending from the first bore through the remaining thicker bodied portion and through the shank portion for receiving an appropriate cutting-assisting fluid and for permitting the withdrawal of the stud from the tool after the stud has been removed from the workpiece.

7. A cutting tool according to claim 6 further comprising a coupling means attached to said second coaxial bore for facilitating the injection of fluids including compressed air for cooling the cutting surface and workpiece preventing any undesirable change in the metallurgical properties thereof.

* * * * *